U S005227963A

United States Patent [19]
Schauder

[11] Patent Number: 5,227,963
[45] Date of Patent: Jul. 13, 1993

[54] FLAT-TOP WAVEFORM GENERATOR AND PULSE-WIDTH MODULATOR USING SAME

[75] Inventor: Colin D. Schauder, Murrysville, Pa.

[73] Assignee: Westinghouse Electric Corp., Pittsburgh, Pa.

[21] Appl. No.: 870,646

[22] Filed: Apr. 16, 1992

[51] Int. Cl.[5] ............................ H02M 1/08; H02P 5/28
[52] U.S. Cl. .................................... 363/41; 323/231; 318/811; 307/268
[58] Field of Search .................... 363/41; 323/231; 318/811; 388/811; 328/54; 307/264, 268

[56] References Cited

U.S. PATENT DOCUMENTS

| | | | |
|---|---|---|---|
| 3,051,905 | 8/1962 | Morris | 307/268 |
| 3,054,967 | 9/1962 | Gindi | 307/268 |
| 3,078,377 | 2/1963 | Brunschweiger | 307/268 |
| 3,238,382 | 3/1966 | Ott | 307/268 |
| 3,970,914 | 7/1976 | Salzmann et al. | 363/45 |
| 4,538,220 | 8/1985 | Gyugi | 363/161 |
| 4,608,499 | 8/1986 | Rathmann | 307/66 |
| 4,656,572 | 4/1987 | Caputo et al. | 363/41 |
| 4,697,131 | 9/1987 | Schauder | 318/762 |
| 4,707,651 | 11/1987 | Schauder | 318/800 |
| 4,709,158 | 11/1987 | Almering et al. | 307/268 |
| 4,728,815 | 3/1988 | Main | 307/268 |
| 4,885,518 | 12/1989 | Schauder | 318/789 |
| 4,959,602 | 9/1990 | Scott et al. | 318/803 |
| 4,962,339 | 10/1990 | Schauder | 318/789 |
| 5,153,821 | 10/1992 | Blasko | 363/41 |

Primary Examiner—Steven L. Stephan
Assistant Examiner—Ben M. Davidson

[57] ABSTRACT

A three-phase flat-top waveform generator which may be utilized in a pulse-width modulator. Transfer function means receive a three-phase input signal and produce therefrom a zero sequence signal. Under steady-state and balanced conditions, the zero sequence signal will generally have a fundamental frequency three times the frequency of the input signal. Summing means add the zero sequence signal to each phase of the input signal to produce the desired flat-top signal.

8 Claims, 3 Drawing Sheets

FLAT-TOP WAVEFORM GENERATOR AND PULSE-WIDTH MODULATOR USING SAME

BACKGROUND OF THE INVENTION

1. Field of the Invention

This invention relates to a three-phase flat-top waveform generator. More particularly, the invention relates to a three-phase flat-top waveform generator such as may be utilized in a pulse-width modulator supplying switching signals to operate a three-phase inverter.

2. Description of the Prior Art

Three-phase inverters are commonly used to supply loads requiring three-phase AC where input power is supplied to the inverter in the form of DC. These inverters are typically constructed having "poles" for each phase of the load. Generally, these poles each comprise a pair of serially connected semiconductor switches having respective anti-parallel diodes thereacross. The AC terminal of each pole is the node connecting the two semiconductor switches. Frequently, in the control of these inverters, a three-phase voltage reference signal is generated. This signal is typically fed to a pulse-width modulator which generates firing signals to control the semiconductor switches of each pole. Configurations of this type are illustrated in U.S. Pat. Nos. 4,959,602, 4,707,651, and 4,697,131.

If each phase of the three-phase voltage reference signal is a pure sine wave with a peak approximately equivalent to the range limit ($+L$ to $-L$ volts) of the modulator, the inverter output phase voltages will be sinusoidal and have an amplitude of one-half the value of the DC power supply. Under balanced conditions, the corresponding amplitude of the output line-to-line voltages is the square root of three divided by two (approximately 0.866) times the voltage of the DC power supply. If, however, the per-phase voltages have amplitudes greater than the range limit of the modulator, the line-to-line output voltages of the inverter are not increased.

If the AC load of the inverter is a three-wire system, however, zero sequence components can be introduced into phases of the reference signal without altering their line-to-line voltages. A signal can be generated comprising triplen harmonics ($h=3,9,15$, etc.) of the fundamental frequency such that, when added to each phase of the voltage reference, the range of the modulator can effectively be increased for the fundamental frequency. Using this approach, the amplitude of the output line-to-line voltage can be increased to the full value of the DC power supply. This technique is often referred to as "flat-topping" because it results in the voltage reference signal taking a clipped appearance at the crest of each phase.

In the case of a simple pulse-width modulated ("PWM") system having only voltage and frequency control, it is possible to synthesize the desired triplen harmonics and mix them with the phases of the voltage reference signal in the correct proportion for each prevailing condition. However, if the output currents of the inverter are controlled using closed-loop techniques, then the excursions of the phase reference signals are not readily predictable. In this case it is difficult to generate the required zero sequence component by triplen harmonic synthesis. The current control loops in use generally do not have sufficient closed-loop bandwidth to provide the required flat-topping by their own action. A similar problem arises in any situation where changeable three-phase voltages must be controlled subject to flat-topping.

SUMMARY OF THE INVENTION

Waveform generators practicing the present invention receive a three phase input signal and produce a three-phase flat-top voltage signal which may be utilized, for example, in a pulse-width modulator. Transfer function means connected to means for receiving the input signal generates a zero sequence signal which is added back to the input signal. The transfer function means has first, second and third transfer functions respectively associated with each phase of the input signal. Each of these individual transfer functions has zero gain when the instantaneous voltage of the respective phase is within the desired peak-to-peak voltage swing of the flat-top voltage signal. For instantaneous per-phase input voltages more positive or more negative than the respective positive or negative value of the desired amplitude of the flat-top signal, the transfer functions preferably have positive unity gain. The transfer function means further has means for adding inverted outputs of the first, second and third transfer functions. This forms the zero sequence signal. Summing means are then utilized to add the zero sequence signal to each phase of the input signal.

In presently preferred embodiments the generator may be implemented using several operational amplifier ("op-amp") networks. Specifically, the transfer function means may comprise a transfer function implementation network having an op-amp functioning to sum respective signals received from positive half-wave input signal processing circuitry and negative half-wave input signal processing circuitry. The positive half-wave input signal circuitry comprises first, second and third rectifier diodes having anodes electrically connected to receive respective phases of the input signal. Cathodes of the first, second and third rectifier diodes are electrically connected together and are further connected to the front side of a first zener diode having a zener voltage equivalent to the desired amplitude of the flat-top signal. The back side of the first zener diode is electrically connected to the summing node through an interposing first input resistor. The negative half-wave input circuitry comprises fourth, fifth and sixth rectifier diodes having respective cathodes electrically connected to receive respective phases of the reference signal. Anodes of the fourth, fifth and sixth rectifier diodes are electrically connected together and further connected to a back side of a second zener diode also having a zener voltage equal to the desired amplitude of the flat-top signal. The front side of the second zener diode is electrically connected to the summing node through an interposing second input resistor. Preferably, the first and second input resistors have equivalent resistance values. A feedback resistor preferably having a resistance value equal to the input resistors is electrically connected from the summing node to the op-amp output. The summing means may comprise first, second and third unity gain inverting op-amp summing networks.

Pulse-width modulators utilizing the waveform generator of the invention typically may comprise in addition to the above a carrier waveform generator producing an appropriate carrier signal such as a triangle waveform which has an amplitude equal to the desired amplitude of the flat-top signal. Differencing means subtract the carrier waveform from each phase of the three-phase flat-top voltage signal. Further, comparators may be provided for each phase of the modulated signal to produce a logic "on" signal when the output of the differencing means is positive and a logic "off" when the output of the differencing means is negative.

DETAILED DESCRIPTION OF PRESENTLY PREFERRED EMBODIMENTS

In accordance with the invention, a waveform generator may be provided which receives a three-phase input signal and automatically produces as an output when needed a three-phase flat-top signal. This generator may be used in a pulse-width modulator driving a three-phase inverter to increase the usable line-to-line output voltage of the inverter to the full DC voltage of the power source. The invention is particularly useful in closed loop systems where the voltage reference signal is changing to meet instantaneous demands.

Figure 1:
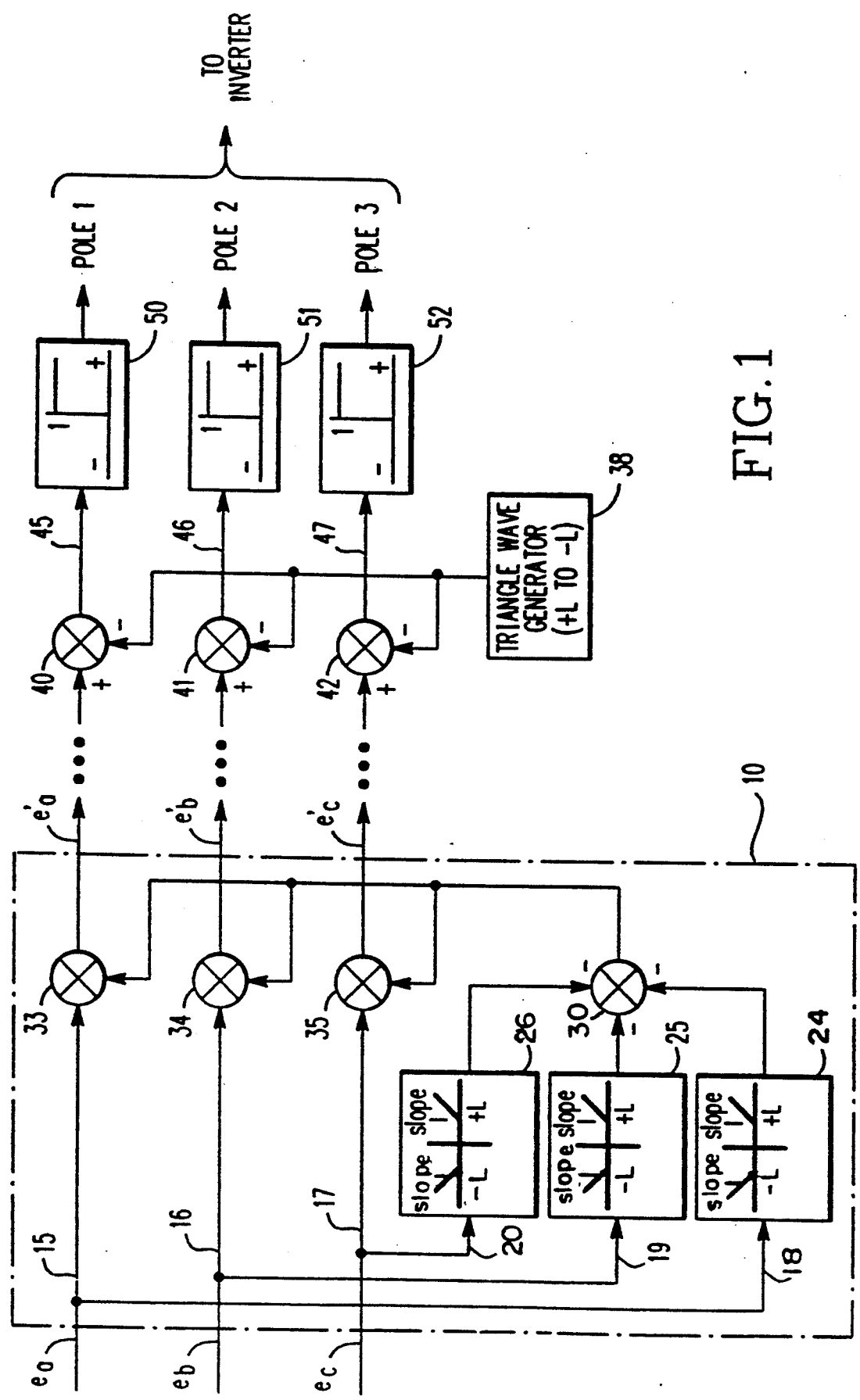
FIG. 1 is a diagrammatic view of a pulse-width modulator using a three-phase flat-top waveform generator 10 constructed in accordance with the invention.

Referring to FIG. 1, a presently preferred embodiment of a pulse-width modulator is illustrated incorporating a flat-top waveform generator 10 of the invention. Waveform generator 10 receives phase signals $e_a$, $e_b$, and $e_c$ of a three-phase input signal on input lines 15, 16 and 17, respectively. Typically, the input signal will be a reference voltage signal such as may be modulated and utilized to operate a pulse-width modulated inverter. Phase signals $e_a$, $e_b$, and $e_c$ are processed by transfer function means to produce a zero sequence signal which, under balanced steady-state conditions, generally has a fundamental frequency three times that of the input signal.

Specifically, phase signals $e_a$, $e_b$, and $e_c$ are respectively delivered via lines 18, 19 and 20 to individual transfer functions 24, 25 and 26. Means are provided at junction 30 to add inverted outputs of transfer functions 24, 25 and 26, thus forming zero sequence signal $e_z$ of desired amplitude L. As is shown, the transfer functions 24, 25 and 26 each have zero gain when the associated phase of the input signal has an instantaneous value of $-L$ to $+L$. When the instantaneous value of the associated phase is more positive or more negative than $+L$ or $-L$, respectively, transfer functions 24, 25 and 26 each have a linear positive gain characteristic which is preferably positive unity gain. Summing means then functions to add signal $e_z$ back to each phase of the input signal to produce the desired three-phase flat-top output signal. Specifically, signal $e_z$ is respectively added to signals $e_a$, $e_b$, and $e_c$ at summing junctions 33, 34 and 35, to produce flat-top phase signals $e'_a$, $e'_b$, and $e'_c$.

Figure 2A:
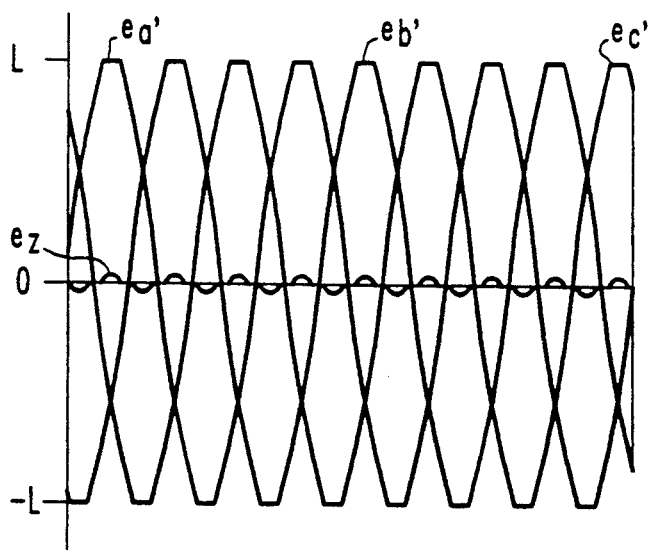
FIGS. 2A, 2B, and 2C are graphical views respectively illustrating flat-top waveform signals generated by the invention based on progressively greater amplitude third harmonic zero sequence signals.
Figure 2B:
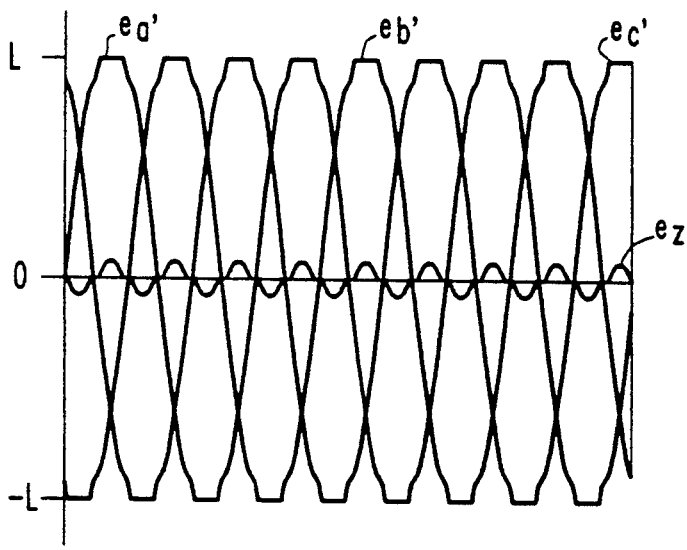
Figure 2C:
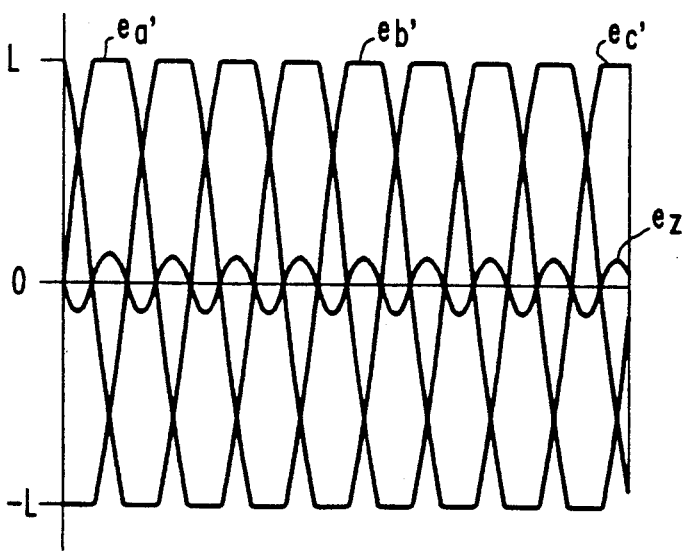

Referring to FIGS. 2A, 2B and 2C, it can be seen that progressively greater per-phase amplitudes of signals $e_a$, $e_b$, and $e_c$ give signal $e_z$ increasingly more definite flat-top characteristics. Specifically, FIG. 2A illustrates per-phase input signal amplitudes of 1.05 L. Here, an effective, but relatively moderate flat-top width is produced. FIG. 2B similarly illustrates the case where the input signal has per-phase amplitudes of 1.1L. FIG. 2C illustrates input signal phase amplitudes of 1.15 L, which is generally the upper limit at which the flat-topping technique is considered effective.

Additional functions added to the waveform generator produce an effective modulator for driving an inverter or other similar uses. Referring again to FIG. 1, such a modulator may be effected using a carrier waveform generator and differencing means to respectively subtract the carrier from phase signals $e'_a$, $e'_b$, and $e'_c$. Thus, in presently preferred embodiments, a triangle wave generator 38 outputs a triangle wave having a carrier frequency and a peak-to-peak voltage swing of $+L$ to $-L$. The triangle wave is then subtracted at differencing junctions 40, 41 and 42 from phases $e'_a$, $e'_b$, and $e'_c$, respectively. This produces modulated signals on lines 45, 46 and 47. Firing signals to gate pole switches of a power inverter may be generated by passing the modulated signals through appropriate comparator means, such as phase comparators 50, 51 and 52. Comparators 50, 51 and 52 output a logic one (or "on") when the modulated signal is positive and a logic zero (or "off") when the modulated signal is negative. The final output is thus pulse-width modulated firing signals for inverter poles A, B and C, respectively. The invention thus constructed has been found to very effectively provide the desired full DC line-to line voltage.

Figure 3:
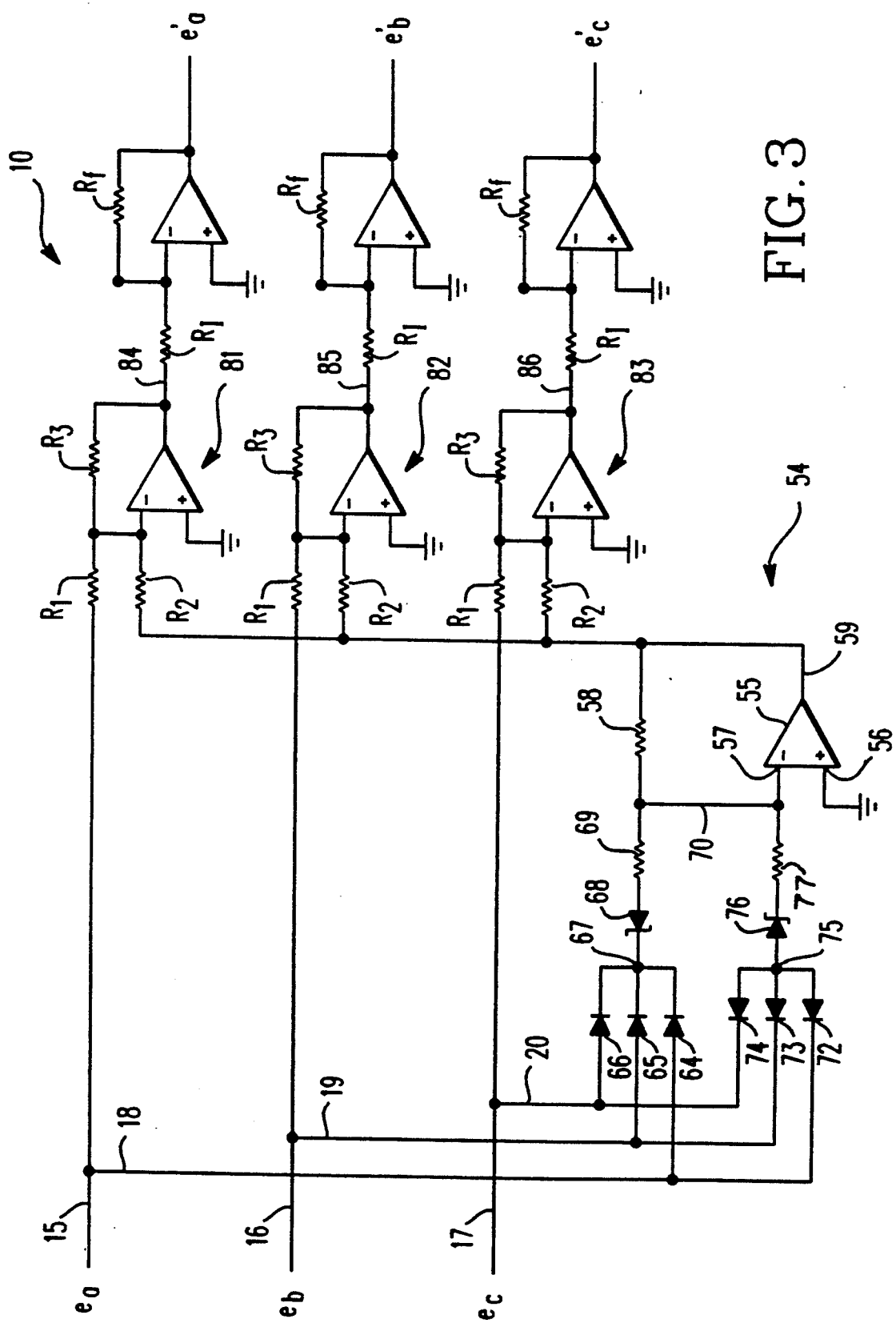
FIG. 3 is a schematic of a presently preferred circuit implementation of a flat-top waveform generator constructed in accordance with the invention.

FIG. 3 illustrates a presently preferred circuit implementation of waveform generator 10. Other arrangements, however, can be utilized to produce the same results. It is contemplated that these other arrangements may be desirable in presently unforeseen applications and uses of the invention. Here, transfer functions 24, 25 and 26 are realized using a transfer function implementation network 54. At the heart of network 54 is an operational amplifier ("op-amp") 55. Op-amp 55 is arranged in a negative feedback summing configuration. As such, the noninverting input 56 is grounded. Inverting input 57, on the other hand, is electrically connected through interposing feedback resistor 58 to output 59. A positive half-wave input signal is produced by positive half wave processing circuitry which includes rectifier diodes 64, 65 and 66. Anodes of diodes 64, 65 and 66 are respectively electrically connected to lines 18, 19 and 20. The cathodes of diodes 64, 65 and 66 are electrically connected together at node 67, which is wired to the front side of zener diode 68. Zener diode 68 should have a zener voltage equivalent to L volts. The back side of diode 68 is connected through input resistor 69 to summing node 70. In an analogous manner, a negative half-wave input signal is provided by negative half-wave processing circuitry which includes rectifier diodes 72, 73 and 74. Diodes 72, 73 and 74 have respective cathodes connected to lines 18, 19 and 20. Anodes of diodes 72, 73 and 74 are electrically connected together at node 75. Node 75 is further electrically connected to a back side of zener diode 76, which also has a zener voltage of L volts. The front side of zener diode 76 is connected through input resistor 77 to summing node 70.

Diodes 64, 65 and 66 function to allow only positive half-waves of respective phase signals $e_a$, $e_b$, and $e_c$ to pass to zener diode 68. If the instantaneous phase voltages are less than voltage L, zener diode 68 will not conduct. If, however, the voltage exceeds this value, conduction of current through input resistor 69 will occur. Similarly, negative half-wave values of the respective phase signals $e_a$, $e_b$, and $e_c$ are rectified by diodes 72, 73 and 74. If the instantaneous values of the phase voltages are more negative than $-L$ volts, then current will conduct through input resistor 77. When current flows through input resistors 69 and 77, network 54 sums the inverse of the half-wave signals. If resistor 58 has the same resistance value as resistors 69 and 77, network 54 will provide the desired positive unity gain for input values outside the range of $-L$ to $+L$.

Zero sequence signal $e_z$ thus produced is fed to op-amp summing networks 81, 82 and 83 which are respectively connected to receive input phase signals $e_a$, $e_b$, and $e_c$. Each of the networks 81, 82 and 83 receives signal $e_z$ at their respective inverting inputs through input resistance $R_2$. Individual phase input voltages $e_a$, $e_b$, and $e_c$ are similarly received through resistance $R_1$. The ratio of resistor $R_3$ to the input resistors provides the necessary gain characteristics. Preferably, $R_1$, $R_2$, and $R_3$ have equivalent resistance values. Output signals appearing at respective outputs 84, 85 and 86 will be the inverse of desired output flat-top phase signals $e'_a$, $e'_b$, and $e'_c$. This is equivalent to a 180° phase shift of these signals. If it is necessary to have the actual values of $e'_a$, $e'_b$, and $e'_c$ as eventual outputs, then unity-gain op-amp networks 90, 91 and 92 may be utilized. Such inverting networks are well known, having an input resistance $R_i$ equivalent to feedback resistance $R_f$. In order to provide the necessary signal characteristics while at the same time keeping currents low, all of the circuit's resistors may have a resistance value of 10,000 Ohms.

The invention dynamically produces a zero sequence signal which can be used to effectively provide a three-phase flat-top voltage signal. The result is generally the same even when the input signal is subject to closed loop control and is thus experiencing unpredictable and even nonperiodic excursions. Although certain preferred embodiments have been described and shown herein, it is to be understood that various other embodiments and modifications can be made within the scope of the following claims.

I claim:

1. A three-phase flat-top waveform generator operable to receive a three-phase input signal and produce a three-phase flat-top voltage signal, each phase of said three phase flat-top voltage signal having amplitudes of predetermined voltage L, said waveform generator comprising:
   means for receiving said three-phase voltage input signal;
   transfer function means for producing a zero sequence signal based on said input signal;
   said transfer function means having first, second and third individual transfer functions respectively associated with each phase of said input signal, each said individual transfer function having zero gain when an instantaneous voltage of an associated phase of said input signal is in a range of $-L$ to $+L$, a first linear positive gain when said instantaneous voltage is more positive than $+L$, and a second linear positive gain when said instantaneous voltage more negative than $-L$;
   said transfer function means further having means for adding inverted outputs of said first, second and third transfer functions to form said zero sequence signal; and
   summing means for adding said zero sequence signal to each said phase of said input signal to produce said three-phase flat-top voltage signal.

2. The generator of claim 1 wherein said first and second linear positive gains of said individual transfer functions are both linear unity gain.

3. The generator of claim 1 wherein said transfer function means comprises a transfer function implementation network and wherein said summing means comprises first, second and third inverting op-amp summing networks.

4. The generator of claim 3 wherein said transfer function implementation network comprises:
   an operational amplifier having a grounded non-inverting input and an inverting input, said inverting input electrically connected to an output of said operational amplifier through an interposing feedback resistor and further connected to a summing node receiving a positive half-wave input signal and a negative half-wave input signal;
   positive half-wave processing circuitry producing said positive half-wave input signal including first, second and third rectifier diodes having respective anodes electrically connected to receive each phase signal of said input signal, said first, second and third rectifier diodes further having cathodes electrically connected together to a front side of a first zener diode having a zener voltage of L volts, said first zener diode having a back side electrically connected through an interposing first input resistor to said summing node;
   negative half-wave processing circuitry producing said negative half-wave input signal including fourth, fifth and sixth rectifier diodes having respective cathodes electrically connected to receive each phase signal of said input signal, said fourth, fifth and sixth rectifier diodes further having anodes electrically connected together to a back side of a second zener diode having a zener voltage of L volts, said second zener diode having a front side electrically connected through an interposing second input resistor to said summing node.

5. The generator of claim 4 wherein said first and second input resistors and said feedback resistor are rated at equivalent resistance values.

6. The generator of claim 3 wherein said first, second and third inverting op-amp summing networks each comprise:
   an operational amplifier having a grounded noninverting input and an inverting input, said inverting input electrically connected to a summing node and further electrically connected to an output of said operational amplifier through an interposing feedback resistor;
   a first input resistor electrically connected to said summing node and connected to receive a respective phase of said input signal; and
   a second input resistor electrically connected between said summing node and an output of said transfer function implementation network.

7. The generator of claim 1 further comprising:
   a carrier waveform generator producing a carrier waveform having a peak-to-peak voltage swing of $+L$ to $-L$ volts;
   differencing means for subtracting said carrier waveform from each phase of said three-phase flat-top voltage signal; and
   comparator means for receiving each phase of an output of said differencing means, said comparator means giving a logic off output when said output of said differencing means is negative and a logic on output when said output of said differencing means is positive.

8. The generator according to claim 7 wherein said carrier waveform is a triangle waveform.

* * * * *